Sept. 18, 1945.   W. LEATHERS ET AL   2,385,007
DATA STORING DEVICE AND DATA SELECTING MEANS THEREFOR
Filed Oct. 15, 1942    4 Sheets-Sheet 1

INVENTORS:
Ward Leathers,
Hugo Parissidi.
ATTORNEY

Patented Sept. 18, 1945

2,385,007

UNITED STATES PATENT OFFICE

2,385,007

DATA STORING DEVICE AND DATA SELECTING MEANS THEREFOR

Ward Leathers, Brooklyn, and Hugo Panissidi, Jamaica, N. Y., assignors to International Business Machines Corporation, New York, N. Y., a corporation of New York Application October 15, 1942, Serial No. 462,202

2 Claims. (Cl. 235—61.6)

The present invention relates to accounting machines, and more particularly to a machine for use in a system utilizing perforated records for compiling accounting data according to a selected code. More specifically, the invention is concerned with a translating machine whereby information contained on a record media, which may be in the form of a perforated tape, is used as a basis for numerous computations of an accounting nature and the computed data automatically recorded on a second record media, which also may be in the form of perforated tape. The apparatus is thus particularly useful in connection with that type of accounting where complex rates are involved, as for example, in public utility accounting where electric current consumption or gas consumption is charged for according to a sliding scale rate with numerous additional charges, such as fuel adjustment and tax charges, being involved in the transactions. The invention, however, is useful in other regards and the same may, with or without modification, be employed in connection with various sales, market, and other transactions, whether financial or otherwise. Irrespective, however, of the specific use to which the invention may be put, the essential features thereof are at all times preserved.

The principal object of the invention is to provide an accounting machine of the character set forth above wherein certain precomputed data, as derived from an initial set of figures, for example the ten digits of the Arabic system, may be electrically set up in the machine and wherein the precomputed data may automatically be selected as one or more of the figures are received by the machine according to initial data material and the resultant data suitably recorded by a series of perforating or printing operations on a record media which, in the case of perforating operations, may be a tape or the like. In carrying out the above mentioned object, the initial data received by the machine may be received as figures of the Arabic system or as code characters, and likewise the precomputed data derived therefrom may be set up in the machine according to Arabic or code characters. Similarly, the ultimate recorded data may be printed on the record media in Arabic characters, or it may be perforated on the media according to a selected mode which may be the same or a different code from that employed for the original data. For simplicity of operation, as well as for simplicity of equipment, the invention has been illustrated herein in the form of an accounting machine wherein the initial data is received in the form of a simplified four line code, the precomputed data set up according to that code and the result also perforated on the record media according to the same code.

Heretofore, apparatus for the electrical storage of predetermined data has been relatively complicated and has operated upon electrical principles requiring an unduly large amount of electrical equipment. One type of apparatus for this purpose which is capable of receiving only ninety-nine initial data figures and of electrically translating the same into a predetermined code, has required for its successful operation a minimum of two hundred and ten magnets, together with numerous clutches, by means of which certain data storing drums are selectively operated. The present invention is designed to overcome this limitation of excess electrical and mechanical equipment and, toward this end, contemplates the provision of an apparatus whereby, because of the simplified code chosen for its operation and because of other considerations, it is capable of receiving nine hundred and ninety-nine initial figures or characters, of translating the same and recording the translated data with the use of only twenty magnets, ten storage drums and ten clutches for the selective operation thereof.

It is another object of the invention to provide an apparatus of this character wherein the precomputed data is adapted to be set up on a series of rotatable drums by means of settable pins, which pins are selectively receivable in various apertures or holes provided at the surface of the drum and which are adapted to close individual circuits upon selection and operation of the respective drums upon which they are mounted.

Another object of the invention is to provide an apparatus having data storing drums, as outlined above, wherein means are provided for manually altering the character of the data which may be stored in the drums, while the drums are operatively stored in the apparatus and without requiring removal of the same.

Another object of the invention is to provide an apparatus having drums upon which the precomputed data may be stored, and in which means are provided whereby the data may be readily set up on the drums by a simple manual operation, or the existing data on the drums may readily be altered by such an operation without requiring the use of special tools and without altering existing electrical circuits associated with the machine.

A still further object of the invention is to provide a novel form of circuit-closing drum data pin, which is readily insertable into and removable from the pin receiving perforations provided in the data storing drums of the present invention.

Still another object of the invention is to provide an accounting apparatus of the type outlined above, which is fully automatic in its operation and which will operate to receive the initial data, make the translation thereof according to the selected code, and record the same in code substantially instantaneously one complete character at a time.

With these and other objects in view, which will become more readily apparent as the nature of the invention is better understood, the same consists in the novel construction, combination and arrangement of parts shown in the accompanying four sheets of drawings, in which.

In all of the above described views like characters of reference are employed to designate like parts throughout.

*Brief description*

Figure 6:
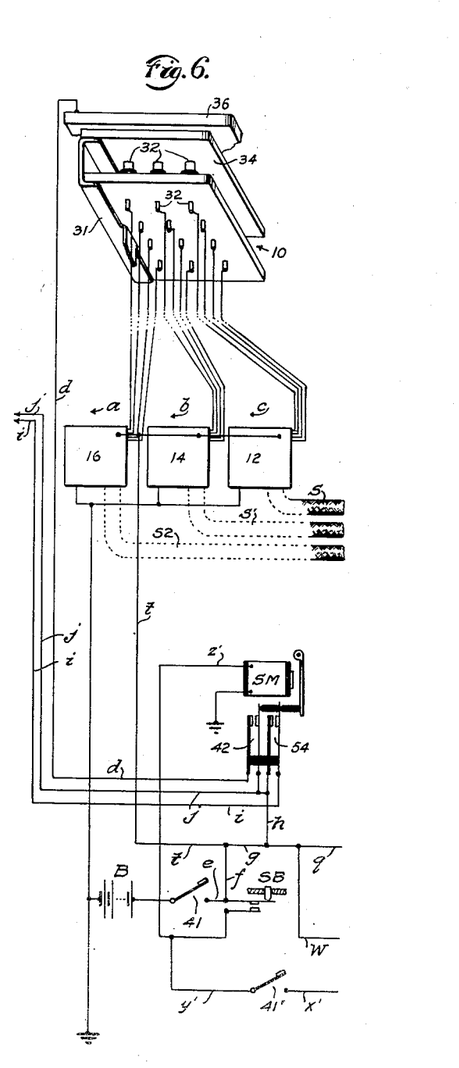
Fig. 6 is a fragmentary diagrammatic view of a sensing mechanism employed in connection with the present invention, together with its associated electrical apparatus.
Figure 7:
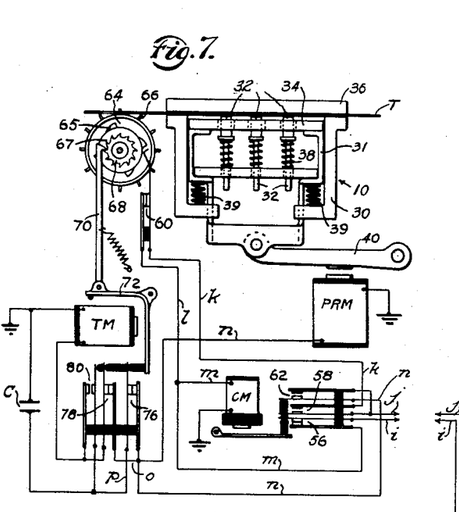
Fig. 7 is a similar diagrammatic view of the sensing mechanism showing the tape driving instrumentalities associated therewith.
Figure 9:
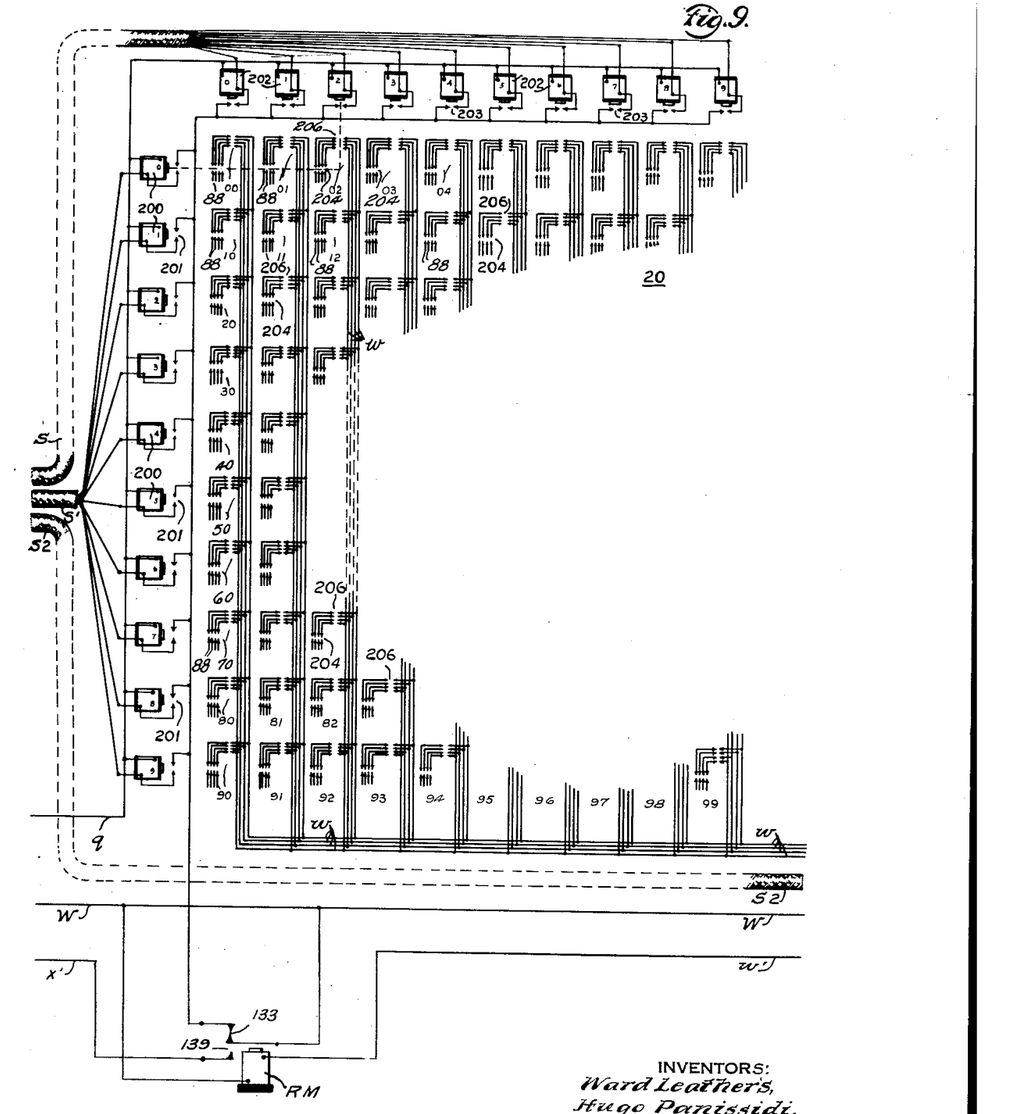
Fig. 9 is a diagrammatic view of a selecting apparatus employed in connection with the present invention.
Figure 10:
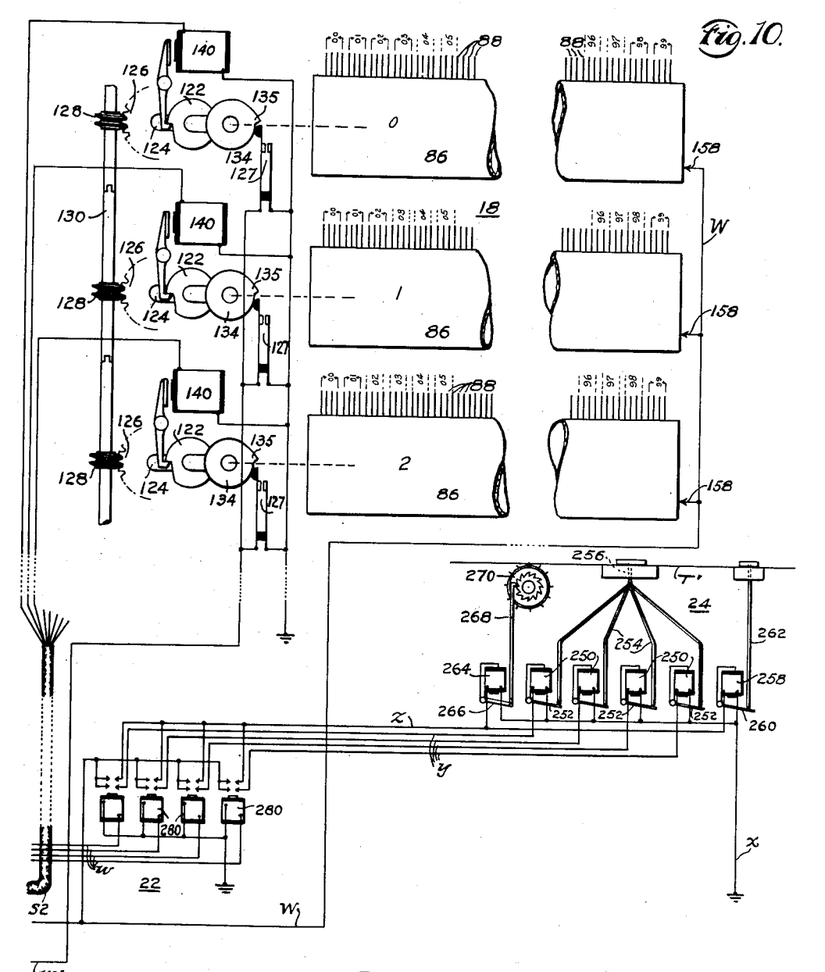
Fig. 10 is a fragmentary diagrammatic view showing the various electrical connections for the drum mechanism and also showing the recording mechanism and its associated circuits.

Referring now to the drawings in detail, and particularly to Figs. 6 and 7, original or initial data, which may be in the form of a perforated tape T, is received in the apparatus by means of a sensing device 10, to which the tape T is fed. The data appearing on the tape T is in the form of a series of perforations occurring at each index point position of the tape according to a selected code, as shown on a strip of tape T'' in Fig. 11. By means of the sensing apparatus 10 a plurality of electrical circuits, arranged in three groups, one for each digit of a three-digit number, are closed simultaneously, and upon closing thereof a corresponding number of decoding devices 12, 14 and 16, representing units, tens and hundreds digits of the initial number, are set into operation. At the output of the decoding devices 12, 14 and 16, additional circuits are closed, by means of which one of a plurality of data storing drums, forming part of a drum assembly 18, Fig. 10, is selected and set into operation, and also by means of which certain circuit-closing devices carried on the selected drum are selected for operation. The selecting means whereby the particular circuit-closing devices associated with the drums are selected for operation are shown in Fig. 9 and are designated in their entirety at 20. The comparatively low current-carrying circuits, which are adapted to be selectively closed by each drum, extend to an auxiliary current step-up relay apparatus 22 (see Fig. 10) by means of which certain circuits are closed and a recording device or perforator 24 is actuated for recording the translated material on a tape T' by means of code perforations.

While, according to the above brief description, the initial data received by the apparatus is conducted to the apparatus by means of the tape T, the perforations of which are adapted to be sensed by the mechanism 10 (Figs. 6 and 7), it will be obvious that this data may be injected into the machine manually by a suitable keyboard whose output circuits correspond to the circuits leading from the sensing mechanism 10. This keyboard may have equipment whereby the initial data is applied thereto manually according to the various digits of the Arabic system, or, if desired, the keyboard may be provided with a lesser number of keys to accommodate the selected code, in which instance the operator will perform mental coding operations while injecting the initial data into the machine. In the former instance, the decoding devices 12, 14 and 16 may be omitted and suitable keyboards substituted in their stead.

*The sensing apparatus*

The sensing apparatus is more or less conventional in its operation and the same has been especially designed to accommodate the requirements of the present invention. Toward this end, the sensing device includes an outer casing 30 (see Fig. 7) in which there is housed the sensing mechanism 31 proper, including vertically reciprocable sensing pins 32 adapted to move upwardly through a guide bar 34 and selectively make contact through the perforations of the tape T with an electric platen or contact bar 36 in order to establish one or more of a plurality of circuits arranged in groups and whose wire groups are designated respectively at a, b and c and having a common return line d. The sensing pins 32 are individually spring pressed as at 38 and are arranged in horizontal alignment in groups corresponding to the units, tens and hundreds digits of a particular three-digit number representing the initial data. This initial number, according to the present invention, represents the consumption figure of a metered product, as, for example, electric current expressed in watt hours, or gas as expressed in cubic feet. The figure, however, may represent any one of a great variety of transaction records without altering the principles of the present invention.

The sensing pins 32 are collectively shiftable in a downward direction against the action of a plurality of springs 38, by means of an armature 40, (see Fig. 7), associated with a pin retracting electromagnet PRM in order that all of the sensing pins 32 may be withdrawn from, and moved out of contact with, the tape T during tape advancing operations to prevent rupture of the tape upon shifting movement thereof.

Current for energizing the sensing mechanism 10 (Fig. 6) is supplied by a battery B through an initial circuit establishing switch 41, lines e, f, g and h, and a pair of normally open contacts 42 to the common senser line d. The contacts 42 are relay-controlled by means of a starting magnet SM, the energization of which is controlled by a push button SB, and are adapted to be closed upon energization thereof. The application of current to the common return line d is momentary, yet the short current impulse applied thereto is sufficient to initiate various selecting and control operations by means of which the desired translation and recording is made, as will be set forth in detail presently. An additional pair of contacts 54 are positioned under the control of the magnet SM, and upon closing thereof current from the path e, f, g and h is conducted to a line i and from thence through a pair of normally closed contacts 56 (see Fig. 7) through a line m to the winding of a delayed action control magnet CM and from thence to ground. The delayed action of the magnet CM is afforded by means of the usual copper jacket, as shown in Fig. 7, and this delayed action is for a comparatively long period of time in order that none of the contacts 56, 58 or 62 under the control of this magnet shall be disturbed until after the energized sensing mechanism 10 and the decoding mechanism 12 under the control thereof have had time to complete their functions. Were this delayed action not imparted to the magnet CM by the provision of the copper jacket thereon the closing of the pair of contacts 62 would ordinarily cause immediate energization of the magnet PRM and consequent lowering of the carrying carriage. Upon energization of the magnet CM the contacts 56 become opened; but at the same time current issuing from the path e, f, g, h is conducted through a path j and a pair of contacts 58, which become closed upon energization of the magnet CM through a line k to a pair of normally closed contacts 60 and lines l and m to the magnet CM for holding purposes. A third pair of normally open contacts 62 are controlled by the magnet CM and upon closing thereof, current issuing from the path e, f, g, h, j, is conducted to a line n to the pin retracting magnet PRM for energization purposes in order that all of the pins 32 may be withdrawn from the tape T for tape advancing operations.

The sensing pins 32 are adapted to sense all three digits of the consumption or other figure simultaneously and, therefore, means are provided for advancing the tape three index point positions at a time. Toward this end, a tape advancing wheel 64 (see Fig. 7) is provided with the usual tape engaging pins 66 on the periphery thereof and is also provided with a ratchet wheel 68 which cooperates with a pawl 70 carried by the armature 72 of a tape advancing magnet TM, which becomes effective upon deenergization thereof. The wheel 64 is also provided with a cam disc 67 which rotates in unison therewith and having protuberances 65 formed on the periphery thereof.

Energization of the tape advancing magnet TM occurs periodically in groups of three impulses each to accommodate the three digits of the number received on the tape in the sensing apparatus. Toward this end, upon closing of the pair of contacts 62, current issuing from the line e, f, g, h, j, the contacts 62 and line n, passes through line o, a pair of normally closed contacts 76 and line p to a condenser C which becomes charged thereby. Simultaneously, current flows through substantially the same path to a pair of normally closed contacts 78 and from thence through the magnet TM to energize the latter. The contacts 76 and 78, however, which are normally closed, immediately become opened upon energization of the magnet TM and an additional pair of normally open contacts 80 become closed and provide a path for discharging the condenser C through the winding of the magnet TM to insure positive energization thereof. After the capacitance charge fed to the winding of the magnet TM has become expended, the contacts 76, 78 and 80 assume their normal positions and the process of advancing the wheel 64 is repeated until such time as one of the protuberances 65 formed on the periphery of the cam disc 67 engages the normally closed contacts 60 and opens the same to break the holding circuit on the magnet CM. It will be noted that by virtue of the condenser C and its relation to the magnet TM, full energization of this latter magnet is effected after the pair of contacts 78 have become opened. Thus, full swing of the magnet armature is assured and chattering thereof is prevented. Upon deenergization of the magnet CM, the contacts 62 will assume their normally open position, thus deenergizing the magnet PRM and allowing the sensing pins 32 to move upwardly under the influence of the springs 38 into their operative sensing position.

*The decoding apparatus*

Figure 8:
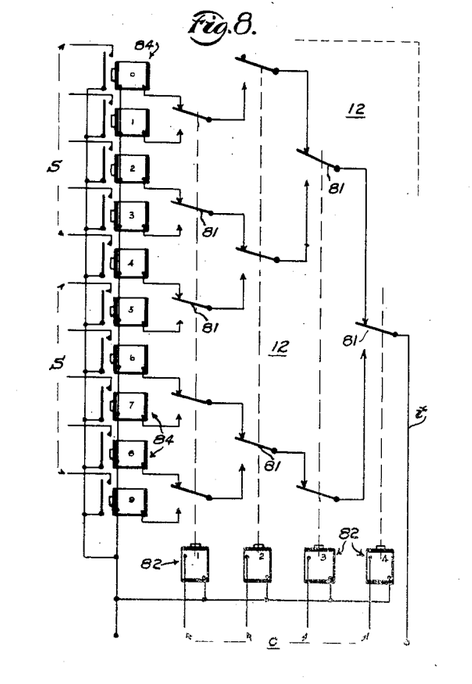
Fig. 8 is a diagrammatic view of a decoder employed in connection with the present invention.
Figure 11:
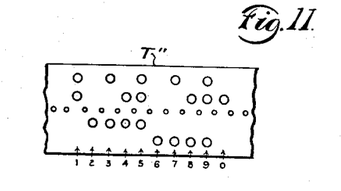
Fig. 11 is a schematic view of a strip of tape showing the specific code employed in connection with the present invention.

The decoding devices 12, 14 and 16 (see Fig. 6) are identical in construction, and it is thought that a brief description of one of these devices will suffice as a description for all of them. Accordingly, in Fig. 8, a decoding apparatus 12 has four input lines c leading thereto and ten output lines s leading therefrom. The specific construction of the decoding device 12, shown in this figure, is immaterial to the present invention and any suitable type of decoding mechanism may be employed. It is merely sufficient to state that when one or more of a series of four coding relay magnets, designated generally at 82 (according to a four-line code), becomes energized under the influence of the sensing pins 32 through the wires c, the proper output circuits s leading from a series of motor magnets designated generally at 84 become closed. The magnets 84 are ten in number and each has been labeled with a digit of the Arabic system. The specific code employed in the present invention is shown in Fig. 11 and, for illustrative purposes, according to this code the numeral 5 is obtained when the relay magnets 82, labeled 1, 2 and 3, are simultaneously energized. In such an instance, current issuing from the battery B will pass through a line t and through a series of two-way switches 81 in the closed path shown in Fig. 8, through the winding of the magnet 84 labeled 5 in order that the output circuit of this magnet may become closed. This latter circuit will become closed to the exclusion of all the other output circuits. The decoding apparatus illustrated in Fig. 8 is purely conventional in its design and is of the type commonly known as Baudot system of decoding, which is widely used in the telegraphic arts.

The storing drum assembly

Referring now to Fig. 10, wherein the drum assembly 18 is diagrammatically shown, this assembly briefly involves in its general organization a plurality of rotatable drums 86, each representing or corresponding to a different digit in the Arabic system. While only three of these drums are illustrated, it will be understood that there are ten such drums in all. All of the drums 86 are identical in construction, and it is thought that a detailed description of one thereof will suffice for the remainder.

Figure 5:
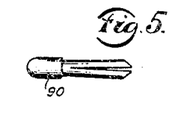
Fig. 5 is a side elevational view of a data storing pin employed in connection with the present invention.

Each drum has associated therewith a plurality of stationary brushes 88, which are arranged in groups of four brushes each, and which total one-hundred groups or four-hundred brushes. The various groups of brushes correspond to the units and tens digits of the initial figures received by the sensing apparatus 10, while the drums themselves correspond to the hundreds digit of this figure. Means in the form of the selecting mechanism 20, shown in Fig. 9, are provided for simultaneously selecting in common corresponding groups of brushes on the various drums to provide the units and tens digits of the initial figures, and means in the form of the decoding device 16 are also provided for selecting a particular drum of the series to provide the hundreds digit of the initial figure. A plurality of removable data storing pins 90 (see Fig. 5) are selectively receivable in a number of apertures 92 provided on the surface of each drum, according to the precomputed data which it is desired shall be stored in the drum as desired from the initial consumption figure received by the sensing apparatus 10, and these pins 90 cooperate with the various drums 86 in closing certain recording circuits, as will appear presently.

Referring now to Figs. 1 to 5 inclusive, wherein the mechanism and constructional details of the drum assembly are disclosed, the drum assembly is comprised of a plurality of separable units 100, each unit accommodating one of the individual drums 86. The various units are capable of being assembled one upon the other in locked relationship with the various units being bolted together as at 102, and thus it will be seen that for different accounting purposes any number of individual drums may be employed. As previously set forth, in the present instance ten such units accommodating ten drums are employed.

Each unit 100 involves in its general organization a base portion 104 from which there extends upwardly at opposite ends thereof a pair of standards 106 and 108. The standards 106 and 108 are provided with bearing surfaces 110 to provide bearing supports for one of the rotatable drums 86. Each drum 86 is in the form of a cylindrical shell 114 formed of conductive metal having an outer cylindrical covering 116 of insulating material which may be in the form of a plastic composition. The front end of the drum is closed by means of an end cap 118 formed of insulating material. A contact ring 119 is fixed to the outer surface of the cap 118 in concentric relationship thereto and makes electrical contact with a similar ring 121 disposed on the inner side of the cap and having a series of outwardly extending spring fingers 123 formed thereon designed for frictional engagement with the inner surface of the metallic shell 114. The ring 119 constitutes a common return lead connection for the metallic data storing pins 90 which cooperate with the brushes 88 for circuit closing purposes, as previously described. A shaft 120 projects through a central opening 112 (see Fig. 2) formed in the end cap 118 and is driven from a shaft 124 which serves as the driven element of a one-revolution clutch device 122 of conventional design. The driving element or shaft 124 of the clutch 122 is provided with a continuously rotating driving gear 126, and the driving gears 126 of all of the drums 86 are adapted to be driven in unison from worm gears 128 mounted on a shaft 130 carried brackets 132 secured to the standard 106, thereby transmitting motion to each drum. The end cap 118 is provided with a pair of diametrically opposed slots 136 in the vicinity of the central opening 112, and a drive pin 138 (see Fig. 2) extending through the shaft 120 is disposed within the slots 136 for drum driving purposes. The shaft 120 is spring pressed as at 125 and is normally urged outwardly away from the end of the drum. A knurled cup-shaped head 123 is formed on the outer end of the shaft 120 and the cylindrical wall thereof is provided with a pair of opposed notches 129 adapted to receive therein a latch pin 131 which projects through the shaft 124. The knurled head 123 and latch pin 131 constitute a releasable driving connection between the shafts 124 and 120. When it is desired to remove the drum 86 from the standards 106 and 108, as for example, when alterations are to be made to the data stored in the drum, the knurled head 123 may be manually retracted to release the same from the latch pin 131. The various drums 86 are adapted to be selectively and separately driven one at a time and selection thereof is made over the group of wires 82 leading from the decoding mechanism 16. Accordingly, each of the one-revolution clutches 122 is provided with an operating magnet 140 carried in a bracket 142 mounted on a respective standard 106. Upon energization of the magnet 140, the shaft 120 is released for operation and is coupled through the clutch 122 to the shaft 124 in driving relationship.

The brushes 88 are arranged electrically in groups of four and each drum is supplied with four-hundred of these brushes, the various groups or brushes corresponding to the two digit numbers from 00 to 99 inclusive. Corresponding brushes on each drum are electrically connected in common into the selector mechanism 20 for simultaneous selection thereof in a manner that will be set forth during the description of such selecting mechanism. A bracket 156, mounted on the base 104, projects upwardly therefrom and is provided with a spring-pressed finger or brush 158 designed for contact with the ring 119, and by means of which a common return lead line for all of the brushes on the drum is effected. The brush 158 is electrically connected into the selector mechanism 20. The various operating magnets 140 are adapted to be selectively energized from the decoding mechanism 16 which represents the hundreds digit of the figure received by the sensing apparatus 10 of Fig. 1.

Figure 1:
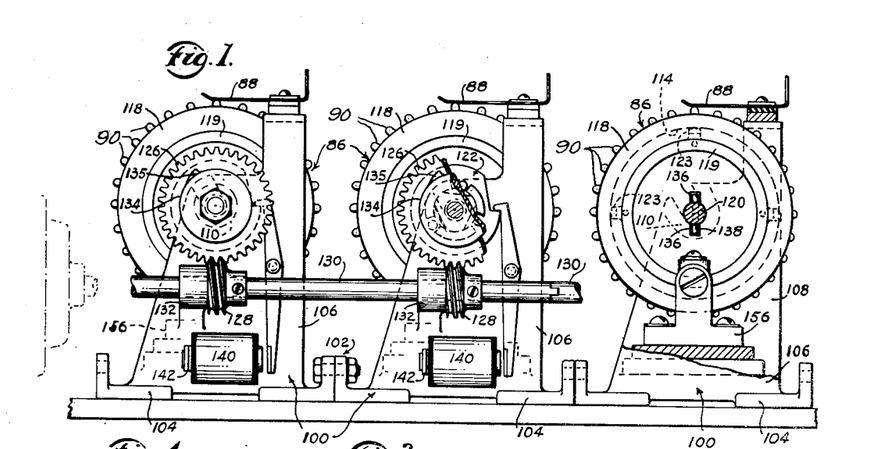
Fig. 1 is a fragmentary end elevational view, partly in section, showing three units of a ten unit data storage drum assembly constructed in accordance with the principles of the present invention.
Figure 2:
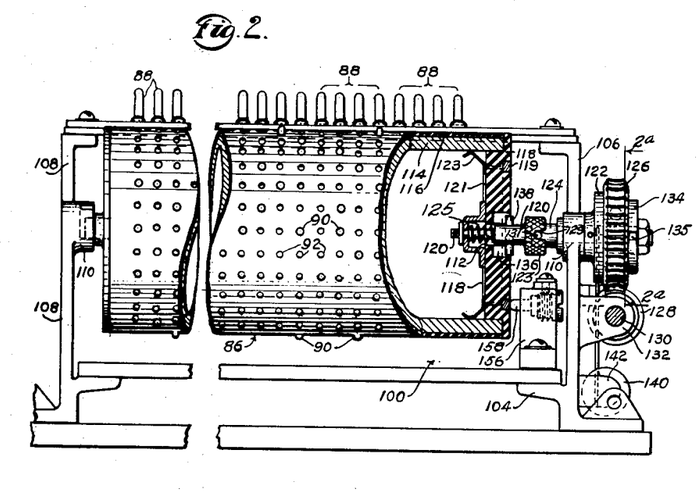
Fig. 2 is a fragmentary side elevational view, partly in section, of the drum assembly shown in Fig. 1.
Figure 2A:
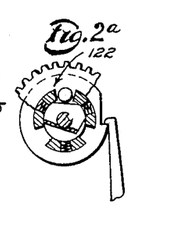
Fig. 2a is a sectional view taken transversely through a conventional one-revolution clutch employed in connection with the present invention.
Figure 3:
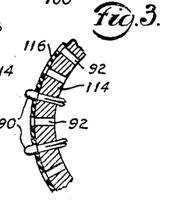
Fig. 3 is a fragmentary sectional view taken transversely through a portion of the periphery of one of the drums.

The one-revolution clutch 122, previously referred to, is more or less conventional in its design and any other similarly acting clutch than the one illustrated herein may well be employed for selective operation and rotation of the drums throughout one complete revolution thereof.

Such clutches are well-known and widely employed in the telegraphic, telephonic and other related arts. The driven element of each clutch 122 has associated therewith a cam disc 134 provided with a protuberance 135 thereon, which cooperates with a pair of contacts 127 disposed in the line w' to close the same upon termination of movement of the drum.

The selecting mechanism

Referring now to Fig. 9, the selecting mechanism 20 is shown in a diagrammatic manner and includes a grid arrangement having ten vertical columns and ten horizontal columns, each of the vertical columns being controlled by a self-locking electromagnet 202, having locking contacts 203, and each of the horizontal columns being controlled by a similar self-locking electromagnet 200, having locking contacts 201. The magnets 200 and 202 are adapted to be unlocked by means of a magnet RM, as will be set forth hereinafter. The magnets 202 are controlled through the group of ten circuit wires S leading from the decoding device 12 which serves to decode the units character of the initial figure which is fed into the apparatus by the sensing mechanism 10. Similarly, the magnets 200 are controlled through the group S' of ten circuit wires leading from the decoding mechanism 14 which serves to decode the tens character of the initial figure. The corresponding brushes 88 (see Fig. 10) on all of the ten data storing drums 86 are connected together electrically and the groups of four brushes each are electrically connected to corresponding selecting circuits leading to the selecting mechanism 20. Thus, for example, the last group of four brushes on each and every drum, which is labeled 99, is connected to the corresponding group on each and every other drum and all of the corresponding groups are connected into the selecting mechanism 20 at the point labeled 99 in Fig. 9. Similarly, all of the other groups associated with the various drums 86 are connected in the selecting mechanism 20 according to the manner in which the labeling appears in Figs. 9 and 10. The various labeled selecting circuits of the selector mechanism 20 have interposed therein a plurality of normally open pairs of contacts 204, the opening and closing movements of which are controlled by the electromagnets 200. Arranged in series with each of the groups of contacts 204 is a similar group of contacts 206, which latter contacts are controlled in their opening and closing movements by means of the various electromagnets 202. The selecting circuits, which are arranged in groups of four, are connected together by a series of four common circuit wires w leading to the relay apparatus 22 (see Fig. 10), by means of which the selected information contained on the various drums 86 is applied to the perforating device 24 and this latter device operated for final recording of information on the tape T'.

It will be seen that whenever the decoding device 12 (see Fig. 8) operates to close one of the circuit wires S and select one of the magnets 202 in the horizontal column of magnets, all of the pairs of contacts 206 in one of the vertical columns will become simultaneously closed. Similarly, whenever the decoding device 14 operates through the group of wires S' to select one of the magnets 200 in the vertical column of magnets, all of the contacts 204 in one of the horizontal rows of contacts will become closed, and in such an instance both the contacts 204 and the contacts 206 of a single group of input wires will become closed in order that the apparatus may perform a selected circuit-closing operation, during which time the precomputed data carried by the selected drum is caused to be recorded by means of the perforating mechanism 24. As previously described, selection of a particular drum 86 is made through the group of circuit wires S2 leading from the decoding apparatus 16, which represents the hundreds digit of the initial figure fed into the machine by the tape T. It will be seen, therefore, that when a particular drum has been selected for revolution through the group of circuit wires S2 and when all of the corresponding groups of contacts are selected by means of the vertical and horizontal series of electromagnets 200 and 202 respectively, one figure of a possible 999 figures will have been selected and the precomputed data for this figure set up in the apparatus will be transmitted to the perforating mechanism 24 for recording thereof. For example, if in the case of public utility accounting for the consumption of electric current in kilowatt hours, 202 kilowatt hours represents a consumption figure encountered by the three sets of sensing pins 32 which are electrically connected to the decoding devices, the decoding device 12 will cause energization of the magnet 202 labeled "2" in Fig. 9 which is the units denominational order of the number. The decoding device 14 will cause energization of the magnet 200 labeled "0" in the selecting mechanism 20 of Fig. 9 which is the tens denominational order of the number. With the magnets 202 and 200 labeled "2" and "0" energized, the four contacts 204 and the four contacts 206 which are collectively labeled "02" in Fig. 9 will become closed, thus potentially closing circuits through certain of the wires w leading to the relay mechanism 22 and from thence to the perforator 24. Only these two groups of contacts 204 and 206 in the entire one-hundred groups thereof will become closed and thus any circuits leading to the perforating mechanism which may be closed must exist through these groups of contacts.

The closing of circuits leading to the perforator 24 through the groups of contacts just described is performed under the influence of the drum 86 shown in Fig. 10 and labeled "2," which drum is selected according to the hundreds digit of the consumption figure 202. Such selection is made through the coding device 16 and wire group S2 as previously described. In the drum 86 certain precomputed data has been set up and among this data are the dollars and cents figures for a consumption of 202 kilowatt hours of electricity (which at 5¢ per KWH would amount to $10.10). This data is precomputed and stored in the hundreds digit-representing drum 86 labeled "2" in the area thereof which is swept by the four contact brushes 88 labeled "02" corresponding to the units and tens digits of the original consumption figure. Therefore, upon rotation of the drum 86 labeled "2," the four contact pins of the group just mentioned sweep over the pins 90 which are placed in the holes 92 in such a manner as to represent a billing charge of $10.10. At successive intervals, depending upon the placement of the pins, current impulses of low current value are sent through the closed contact groups 204 and 206, labeled "02" in Fig. 9, to operate the magnets 280, which in turn close corresponding circuits leading to the perforator 24 to operate the latter.

The perforator and its control device

Referring now to Fig. 10 wherein the perforator 24 and its control device 22 are diagrammatically shown, the perforator involves in its general organization a series of four perforating magnets 250, each having an armature 252 with which there is operatively associated a thrust rod 254, by means of which a series of tape perforating punches 256 are operated for perforating the tape T'. A magnet 258, having an armature 260 operatively associated with a thrust rod 262, is provided for applying drive hole perforations to the tape. An additional magnet 264 having an armature 266 operatively associated with a pawl 268 operates, upon energization thereof, to move the pawl to a retracted position and upon deenergization thereof to advance the pawl in such a manner that a ratchet driven drive wheel 270 advances the tape one index point position at a time. The common return line for all of the magnets is designated at $x$. The individual circuit wires for the four perforating magnets are collectively designated at $y$, while the common circuit wire for the two magnets 264 and 258 is designated at $z$.

Because of the fact that the one-hundred circuit groups leading from the selector mechanism 20 are essentially four-wire circuits, and because of the fact that the circuit lines leading to the perforating mechanism 24 include five wires, it is necessary to employ the relay device 22 for operating the perforator. In addition to this, inasmuch as the various magnets 250, 258 and 264 of the perforating mechanism 24 require relatively high amperage for their work-performing operations, the relay device 22, which requires relatively low amperage for its operation, may conveniently be employed and operated in connection with the output circuit groups leading from the selecting mechanism 20.

The relay device 22 includes a series of four electromagnets 280, each corresponding to and serving upon energization thereof to actuate a corresponding perforating magnet 250 through the previously mentioned group of circuit wires $y$. Each of the magnets 280 in the relay device 22 also operates upon energization thereof through the line $z$ to operate both the drive hole perforating magnet 258 and the tape advancing magnet 264 simultaneously. Thus, whether a character that requires a single perforation in the tape for its expression or whether a character that requires plural perforations in the tape is to be applied to the tape, both the magnets 258 and 264 will become operative for tape perforating and driving operations.

Figure 4:
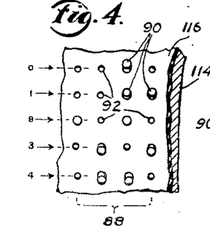
Fig. 4 is an outside elevational view of the drum fragment shown in Fig. 3.

In the operation of the apparatus, the manually controlled circuit closing switches 41 and 41' (Fig. 6) are first closed, whereupon current issuing from the battery B passes to the common line $t$ leading from the decoding mechanism, to the common line $q$ leading to the various magnets 200 and 202 of the selecting mechanism 20, and to the common line W connected to the various common brushes 158 on the drums 86. Upon subsequent depression of the starting switch or button SB, the magnet SM becomes energized and selection of one of the drums 86, according to the hundreds digit of the initial figure received by the sensing mechanism 10, is made through the group of circuit wires $a$ leading to the decoding device 16 and through such circuit wires S2 as are energized by this latter decoding mechanism. Such selection is made by virtue of energization of its respective control magnet 140 which exists in one of the circuit wires contained in the group S2, which operates to release the one-revolution clutch 122 and allow the drum to turn throughout one complete revolution. In Fig. 4 illustration is made of how a consumption figure of $18.34 may be set into one section of the drum. The insignificant zero is represented by a pin received in the third position of the four-line coding apertures. The numeral 1 is represented by the existence of two pins in the last two coding apertures. The numeral 8 is represented by a pin in the first and third apertures respectively. The numeral 3 is represented by a pin in the second and fourth apertures respectively and the numeral 4 is represented by a pin in the second and third apertures respectively, all in accordance with the code showing of Fig. 11.

Simultaneously with the closing of circuits in the group of wires S2, additional circuits are closed in the circuit groups S' and S, as previously described, and selection is made of one of the groups of brushes 88 on the rotating drum according to the tens and units digits of the initial figure.

Provision in the form of the pins 90 is made on each drum for setting up precomputed or precalculated data associated with each initial figure to the extent of any number of digits, depending upon the circumferential extent of the drum. Where public utility accounting is concerned, and joint accounting of gas and electric consumption is resorted to, ordinarily twenty-five digits will suffice. Where payroll, insurance and other forms of accounting are concerned, or where sales transactions are precomputed and stored on the drums, a greater or lesser number of digits may be sufficient.

The various pins 90 are manually placed in the apertures 92 according to the precomputed data and according to the selected code, which in the present instance is the four-line code of Fig. 11. Upon rotation of the drum, engagement of the pins 90 by the brushes 88 causes corresponding circuits to be closed and corresponding magnets 250 in the perforator 24 will be energized, and the proper code material, as set up in the drum, is reproduced in the tape one character at a time.

Upon completion of the rotation of the drum 86, (Fig. 10) the protuberance 135 on the cam disc 134 will engage the pair of contacts 127 and momentarily close the same in passing. The momentary closing of the contacts 127 serves to apply an impulse of current to the delayed action restart magnet RM, which operates to open a normally closed pair of contacts 133 and to close a pair of normally open contacts 139. Opening of the pair of contacts 133 serves to unlock the self-locking magnets 200 and 202 of the selecting mechanism 20, while closing of the pair of contacts 139 serves to apply an initial impulse to the starting magnet SM, through line $x'$, switch 41', line of $y'$ and line $z'$, in order that the apparatus may repeat its cycle of operations. However, if it is desired that the operation of the apparatus shall be discontinued after any particular cycle of operation, it is merely necessary for the operator to open the switch 41' manually, whereupon the circuit leading through the starting magnet SM is opened so that this magnet will not receive an impulse when the contacts 139 of the magnet RM are again closed. The retarded action of the magnet RM effectively serves to prevent the circuit leading to the magnet SM from becoming open before this magnet has become fully energized.

The invention is not to be limited to the exact arrangement of parts shown in the accompanying drawings or described in this specification as various changes in the details of construction may be resorted to without departing from the spirit of the invention. Only insofar as the invention has been particularly pointed out in the accompanying claims is the same to be limited.

What is claimed is:

1. An apparatus for translating data which is computed according to a prearranged schedule from a series of initial multi-digit figures presented in code form and for recording the translated data in similar code form by means of perforations in a record sheet, including recording instrumentalities, a plurality of rotatable data storing drums each having means for storing data according to the prearranged schedule as derived from all digits of said initial figures, each drum potentially representing a different digit of a relatively high decimal order of said initial figures and the stored data thereon being data derived according to said schedule from said digit and from all combinations of remaining digits of relatively lower decimal orders considered collectively, the data stored by said drums remaining unchanged throughout a plurality of operations of the apparatus until changed in accordance with a new schedule or schedules, means for selectively rotating the drums according to the relatively high decimal order digits of the initial figures, means for selecting the data stored in the rotated drum according to the specific combination of the relatively lower decimal order digits of the initial figures, and means operable upon rotation of each drum for operating said recording instrumentalities according to the selected data stored thereon.

2. An apparatus for translating data which is computed according to a prearranged schedule from a series of initial multi-digit figures presented in code form and for recording the translated data in similar code form by means of a perforations in a record sheet, including recording instrumentalities, a plurality of data storing drums each having means thereon for storing data according to the prearranged schedule as derived from all digits of said initial figures, each drum potentially representing a different digit of a relatively high decimal order of said initial figures and the stored data thereon being data derived according to said schedule from said digit and from all combinations of remaining digits of relatively lower decimal orders considered collectively, the data stored by said drums remaining unchanged throughout a plurality of operations of the apparatus until changed in accordance with a new schedule or schedules, continuous rotatable driving means common to all of the drums, a limited revolution clutch disposed between each drum and said driving means and operable upon actuation thereof to cause rotation of the drum throughout a predetermined angle, an actuating device for each clutch, means for selecting the device for operation according to the relatively high decimal order digits of the initial figures, means for selecting the data stored in the drum whose rotation is controlled by the selected device according to the combination of the relatively lower decimal order digits of the initial figures and means operable upon rotation of said drums for operating said recording instrumentalities according to the selected data on the rotated drum.

WARD LEATHERS.
HUGO PANISSIDI.

---

CERTIFICATE OF CORRECTION.

Patent No. 2,385,007. September 18, 1945.

WARD LEATHERS, ET AL.

It is hereby certified that error appears in the printed specification of the above numbered patent requiring correction as follows: Page 6, second column, line 5, beginning with the word "In" strike out all to and including "Fig. 11." in line 18 and insert the same after the period and before "Upon" in line 43, same page and column; line 64, after "line" first occurrence, strike out "of"; page 7, second column, line 7, claim 2, after "means of" strike out "a"; and that the said Letters Patent should be read with this correction therein that the same may conform to the record of the case in the Patent Office.

Signed and sealed this 29th day of January, A. D. 1946.

Leslie Frazer (Seal) First Assistant Commissioner of Patents.